(12) United States Patent
Liu

(10) Patent No.: US 6,535,462 B1
(45) Date of Patent: Mar. 18, 2003

(54) DIGITAL SOUND-SIGNAL BROADCASTER

(75) Inventor: Han-Chih Liu, Tainan (TW)

(73) Assignee: Hanpin Electron Co., Ltd., Tainan (TW)

( * ) Notice: Subject to any disclaimer, the term of this patent is extended or adjusted under 35 U.S.C. 154(b) by 126 days.

(21) Appl. No.: 09/854,566

(22) Filed: May 15, 2001

(51) Int. Cl.[7] .............................................. H04B 1/20
(52) U.S. Cl. ...................... 369/4; 369/2; 369/6; 381/119
(58) Field of Search ................... 369/1, 2, 3, 4, 369/5, 6, 7, 8, 9, 44.28, 30.06, 53.3; 710/261; 463/7; 386/92, 97; 381/119

(56) References Cited

U.S. PATENT DOCUMENTS

| | | | | |
|---|---|---|---|---|
| 5,675,557 A | * | 10/1997 | Hubinger | ........................ 369/4 |
| 5,956,457 A | * | 9/1999 | Hirayama et al. | ............. 386/92 |
| 6,091,684 A | * | 7/2000 | Schell | ............................ 369/3 |
| 6,301,366 B1 | * | 10/2001 | Malcolm, Jr. et al. | ....... 381/119 |
| 6,379,244 B1 | * | 4/2002 | Sagawa et al. | ................. 463/7 |
| 6,421,754 B1 | * | 7/2002 | Kau et al. | .................... 710/261 |

* cited by examiner

Primary Examiner—Ali Neyzari
(74) Attorney, Agent, or Firm—Rosenberg, Klein & Lee

(57) ABSTRACT

A digital sound-signal broadcaster includes a control faceplate to control the rotating speed and direction of a turntable so as to operate the music data of a CD stored in a dynamic memory chip to make a variety of special sound effects to heighten atmosphere of joy, not only easy in handling and convenient in carrying but possible to prevent any wear as well.

4 Claims, 4 Drawing Sheets

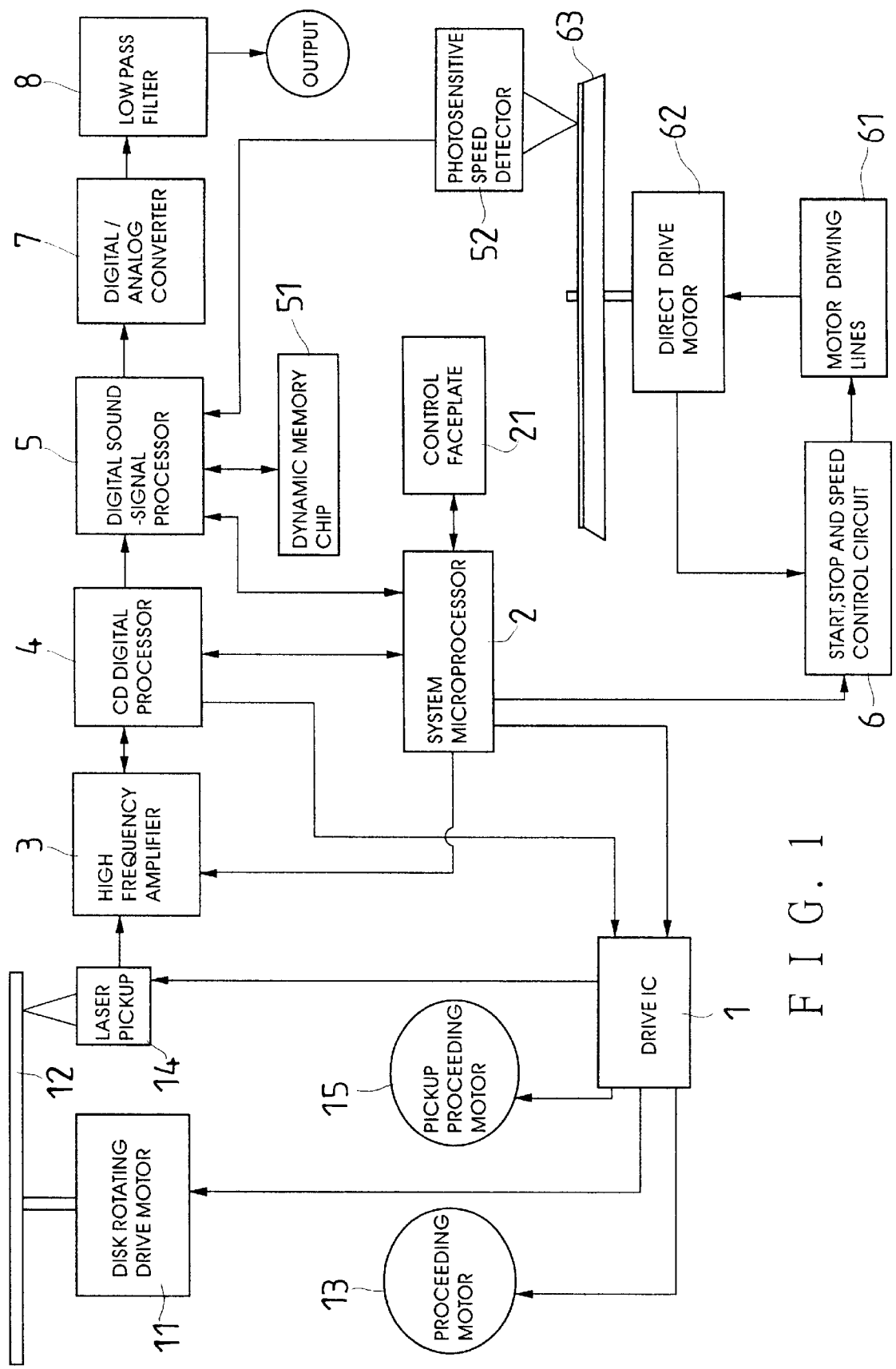
F I G. 1

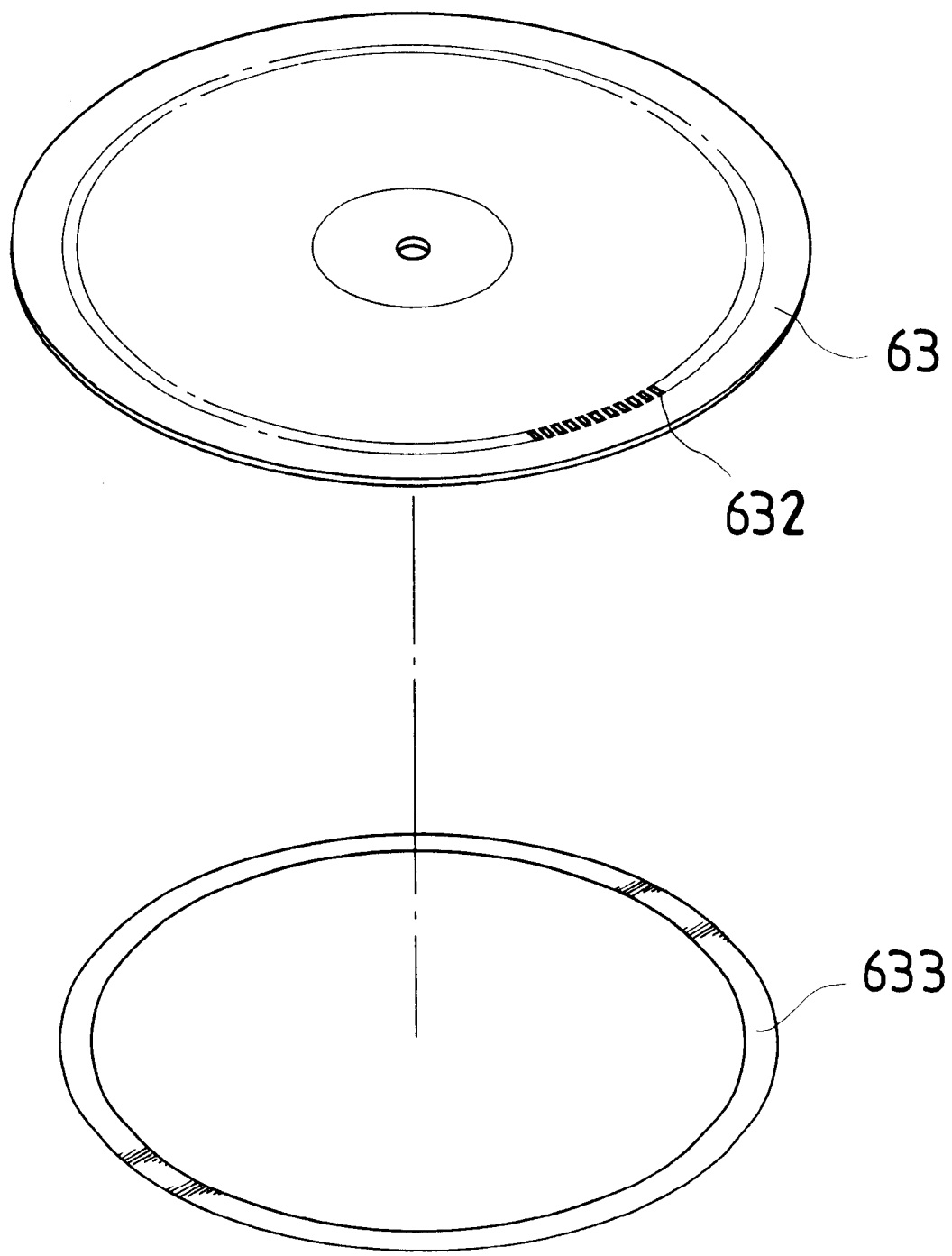
F I G. 3

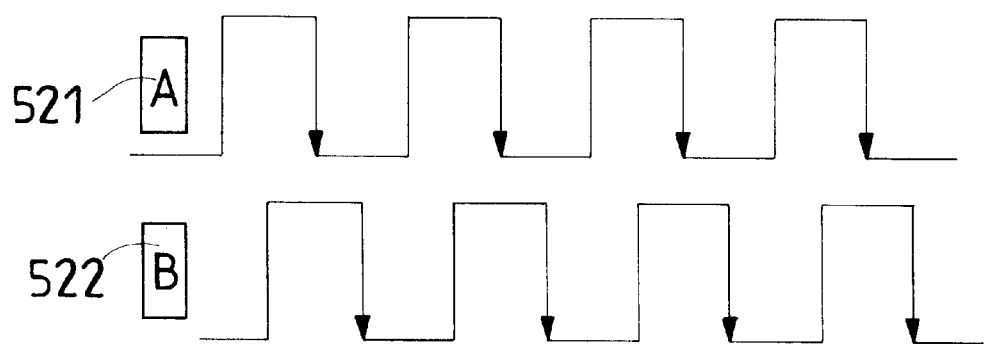
F I G. 4
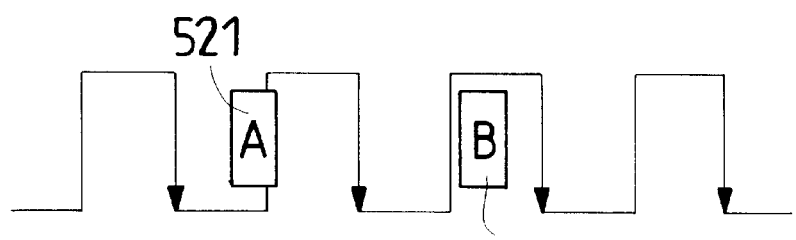
F I G. 5
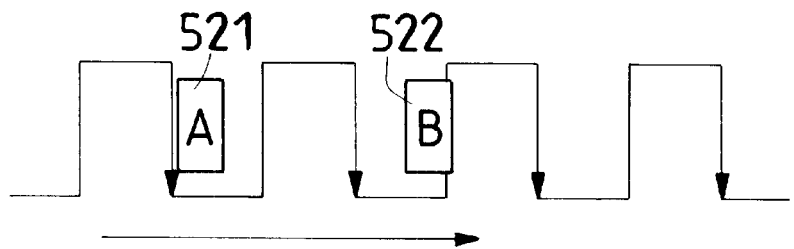
F I G. 6
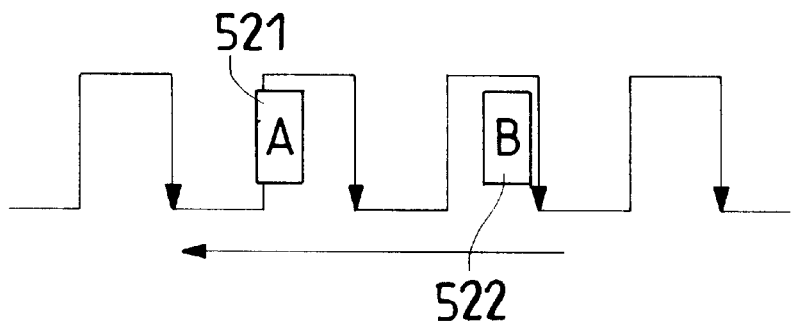
F I G. 7

DIGITAL SOUND-SIGNAL BROADCASTER

BACKGROUND OF THE INVENTION

This invention relates to a digital sound-signal broadcaster, particularly to one capable to make a variety of special sound effects by means of a CD, easy in using and convenient for carrying and possible to prevent any wear.

Conventionally, on an occasion like a pub, a dancing party, a concert or the like, a DJ always makes various special sound effects while broadcasting music by controlling a record to rotate clockwise or counterclockwise and regulate its rotating speed by hands in order to heighten atmosphere of joy, but such a way of handling by hands has some defects described below.

1. A conventional plastic-made disk can broadcast music only in a way of letting the pickup and a record contacting with each other and rotating at a definite speed and direction. If the rotating speed and direction of a record is controlled by hands, the pickup and the record are easy to be damaged and must be replaced very often, thus wasting much money.

2. Not much songs can be recorded in such a conventionally plastic-made record, so in order to prepare enough music for broadcasting, a great number of records have to be prepared in advance, inconvenient in carrying and handling.

3. It is not easy to directly pick out a song he/she wants in such a conventional record without experience, inconvenient in the process of broadcasting.

SUMMARY OF THE INVENTION

The primary objective of this invention is to offer a digital sound-signal broadcaster in which music data of a common CD is read and stored in a dynamic memory chip, and, by checking the rotating speed and direction of the turntable, this music data is modulated to output a variety of special sound effects, possible to prevent any wear.

The second objective of this invention is to offer a digital sound-signal broadcaster in which the music data in a CD can be processed into various special sound effects, and a CD is light and further has a capacity of storing lots of music data, easy and convenient in use and carrying.

The third objective of this invention is to offer a digital sound-signal broadcaster, which has a the control faceplate capable to control and show the condition of songs picked out so that a DJ call handler to select a song he/she wants and to make various sound effects.

BRIEF DESCRIPTION OF DRAWINGS

This invention will be better understood by referring to the accompanying drawings, wherein:

FIG. 1 is a block diagram of an electronic circuit of the present invention.

FIG. 3 is a perspective view of another embodiment of a turntable of the present invention.

FIG. 4 is a diagram of the first judging of timing by a photosensitive speed detector of the present invention.

FIG. 5 is a diagram of the second judging of timing by the photosensitive speed detector of the present invention.

FIG. 6 is a diagram of the third judging of timing by the photosensitive speed detector of the present invention.

FIG. 7 is a diagram of the fourth judging of timing by the photosensitive speed detector of the present invention.

DETAILED DESCRIPTION OF THE PREFERRED EMBODIMENTS

Figure 2:
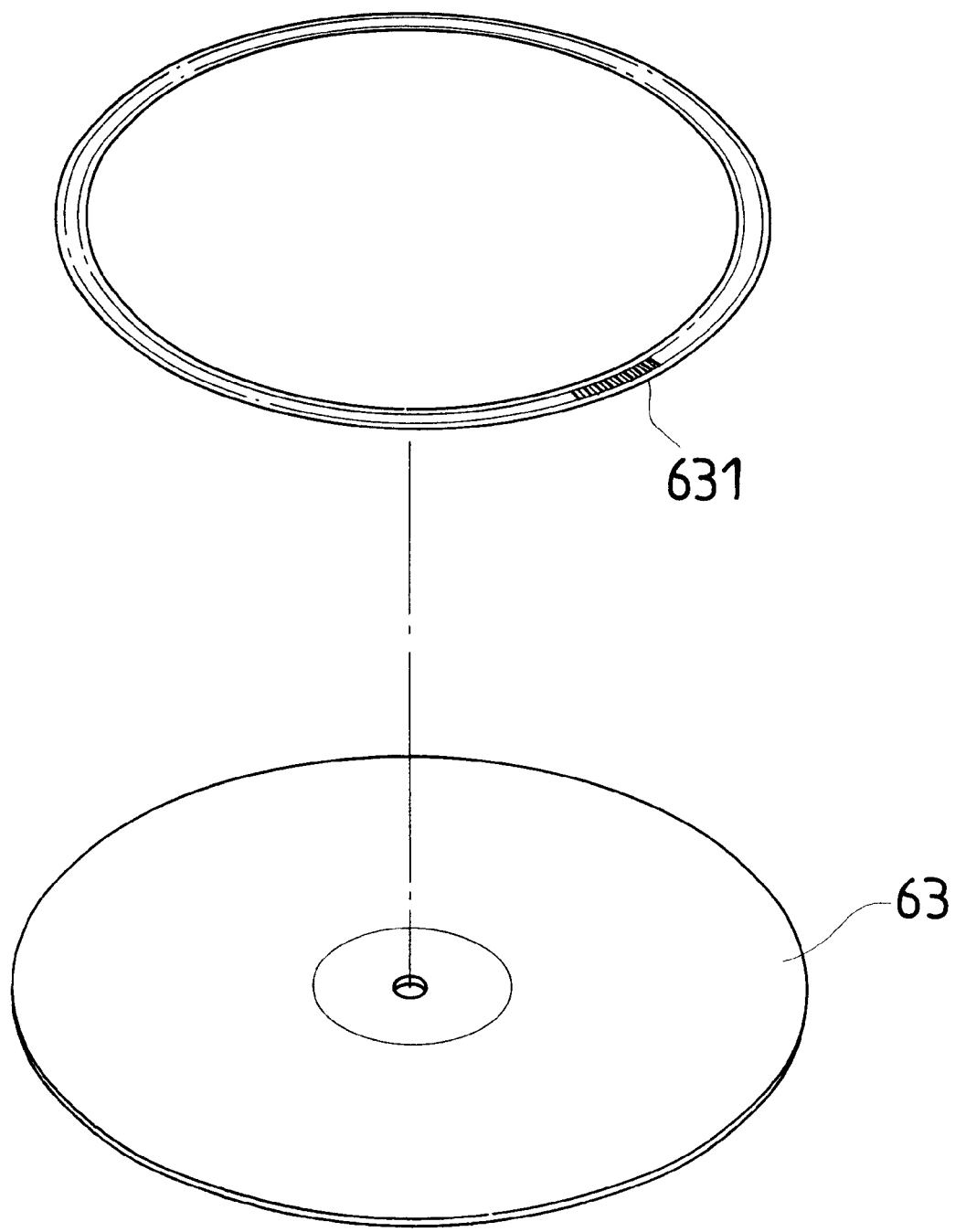
FIG. 2 is a perspective view of a turntable of the present invention.

An embodiment of a digital sound-signal broadcaster of this invention, as shown in FIG. 1, includes an electronic circuit and some other components.

The process of handling the digital sound-signal broadcaster of this invention is as follows.

A CD is placed on a disk tray 12 positioned on a saucer disk drive motor 11 controlled by a drive IC 1, and inputting and withdrawing of the CD is controlled by a proceeding motor 13 driven by a drive IC 1, and then a system micro-processor 2 is actuated to let a high frequency amplifier 3 turn on a laser light and activate a CD digital processor 4 to start a laser pickup 14 via the drive IC 1. The laser pickup 14 driven to rotate around by a pickup proceeding motor 15 controlled by the drive IC 1 will transmit a signal via the high frequency amplifier 3 to said CD digital processor 4 which will notify the system micro-processor 2 whether the signal is focused or not. In case the signal fails to be focused, the system micro-processor 2 will stop any action, and on the contrary, if the signal is successfully focused, it will control the CD digital processor 4, and at the same time a disk drive motor 11 will be started via the drive IC 1 to let the CD on the disk rack 12 rotate at double speed. Then, when the CD rotates together with the disk rack 12, the laser pickup 14 will read the music data in the CD and transmit them to both the system micro-processor 2 and the digital sound signal processor 5 via the high frequency amplifier 3 and the CD digital processor 4. Subsequently, the data of the CD will be shown on a control faceplate 21 by means of the system microprocessor 2, and the music data of the CD will be stored in a dynamic memory chip 51 by the digital sound signal processor 5.

In broadcasting, action needed is input and transmitted in the system micro-processor 2 via the control faceplate 21, and after the system micro-dealer 2 has received the order of action, a start and stop speeding control circuit 6 will control a motor drive circuit 61 and, via a direct drive motor 62, also control starting, stopping and the rotating speed of a turntable 63.

Further, according to the condition of the control faceplate 21 received by the system micro-dealer 2, and based on the information of the turntable 63 controlled by the control faceplate 21 and detected by the photosensitive speeding detector 52, the digital sound signal dealer 5 decides the music data to be stored in the dynamic memory chip 51, arranging songs to be broadcast and regulating the rotating speed and direction of the CD, and, after the music data is converted into analog data by means of a digital/analog converter 7, broadcasting the music via the filtered wave of a low pass filter 8.

In addition, the turntable 63 of this invention can be provided with a light-reflective member 631 printed around its outer circumferential edge, as shown in FIG. 2, or bored with numerous minute holes 632 having light-reflective paper 633 pasted under its bottom, as shown in FIG. 3. Then, the photosensitive speed detector 52 composed of two optical detectors will detect the rotating speed and direction of the CD by means of a A detector 521 and a B detector 522 forming a phase difference of 90 degrees between the signals, as shown in FIG. 4. When the turntable 63 stops rotating, the A detector 521 or the B detector 522 will remain immovable because of no continual simulating signal detected, as shown in FIG. 5. But, as soon as the turntable 63 rotates rightward, the A detector 521 detects the triggering signal, and at the same time, the system micro-processor 2 will calculate time difference between this signal and a next one and synchronously figure out the rotating speed of the turntable 63, as shown in FIG. 6. On the contrary, when the turntable 63 rotates leftward, the B detector 522 detects the triggering signal and notifies the system micro-processor 2 to calculate time difference between two triggering signals detected by the B detector 522, and in the mean while, the rotating speed of the turntable 63 is figured out, as shown in FIG. 7.

Furthermore, after the A detector 521 and the B detector 522 have calculated the rotating direction and speed of the turntable 63, they will wait for a next signal to come and at the same time, judge which signal will reach the triggering position first so as to decide whether there is any need to alter the direction and speed of the turntable 63; Additionally, the turntable 63 itself can be detected its rotating speed and direction by applying a conventional detecting principle of an optical mouse.

As can be understood from the above description, this invention has the following advantages compared with the conventional one.

1. The music data of the CD stored in the dynamic memory is controlled by the rotating speed and direction of the turntable, impossible to result in any wear.
2. A variety of special music can be brought forth by applying the music data in a common CD, which is light and further capable to store a great many of music data, convenient in using and carrying.
3. The control faceplate can be utilized by a user for picking out songs and controlled to make a variety of special sound effects and capable to show an inputting condition and the information of the music data, possible to handle it with easiness.
4. The music data is transmitted to the digital sound signal processor at double speed and then stored in the dynamic memory ship so that the digital sound signal processor can in time broadcast the music data in the dynamic memory chip, no matter the disk on the turntable is rotating clockwise or counterclockwise or at different speed.

What is claimed is:

1. A digital sound-signal broadcaster comprising, a disk tray provided on a disk drive motor controlled by a drive IC and a proceeding motor controlling said disk tray for the inputting and the withdrawing of a disk on said disk tray, said proceeding motor also controlled by said drive IC, a high frequency amplifier turning on a laser light and controlling a CD digital processor to start a laser pickup by means of said drive IC when a system micro-processor is actuated to act, said laser pickup actuated to move by the, pickup proceeding motor controlled by said drive IC, a signal of said laser pickup transmitted to said CD digital processor via said high frequency amplifier, said CD digital processor notifying said system micro-processor whether said signal is focused or not, in case of not focused said system micro-processor stopping any action, in case of focused said system micro-processor controlling said CD digital processor to start a disk drive motor by means of said drive IC to let the CD on said disk tray rotating at double speed, said laser pickup reading the music data of said CD and transmitting them into both said system micro-processor and said digital sound signal processor via said high frequency amplifier and said CD digital processor, then the information of said CD being to be shown on a control faceplate by means of said system micro-processor, and said music data of said CD being to be stored in a dynamic memory chip by means of said digital sound signal processor;

a user inputting needed action through said control faceplate, said needed action transmitted in said system micro-processor via said control faceplate, said system micro-processor controlling starting, stopping and rotating speed of a turntable by means of a start and stop speed control circuit which controls a motor circuit and a direct drive motor, said digital sound signal processor deciding to store said music data in said dynamic memory chip, and arranging songs to be broadcast and regulating the rotating speed and direction according to the condition of said control faceplate received by said system micro-processor and the information of the rotating condition of said disk detected by a photosensitive speed detector, said music data converted into analog data via a digital/analog converter and broadcasted through the filtered wave of a low pass filter.

2. The digital sound-signal broadcaster as claimed in claim 1, wherein a light-reflective member can be printed on an outer circumferential edge of said turntable controlled by said start, stop and speed control circuit for detecting its rotating speed and direction by means of a photosensitive speed detector composed of two optical detectors.

3. The digital sound-signal broadcaster as claimed in claim 1, wherein said turntable controlled by said start, stop and speed control circuit is bored with numerous minute holes around its outer circumferential edge having a light-reflective paper pasted under said minute holes for detecting the rotating speed and direction of said turntable by means of a photosensitive speed detector composed of two optical detectors.

4. The digital sound-signal broadcaster as claimed in claim 1, wherein the rotating speed and direction of said turntable controlled by said start and stop speed control circuit is detected directly by applying the principle of an optical mouse.

\* \* \* \* \*